US012804658B2

(12) United States Patent
Li et al.

(10) Patent No.: US 12,804,658 B2
(45) Date of Patent: Nov. 17, 2026

(54) COMMUNICATION TRANSMISSION METHOD AND APPARATUS AND COMMUNICATION DEVICE

(71) Applicant: VIVO MOBILE COMMUNICATION CO., LTD., Dongguan (CN)

(72) Inventors: Na Li, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 510 days.

(21) Appl. No.: 18/218,038

(22) Filed: Jul. 4, 2023

(65) Prior Publication Data

US 2023/0354343 A1 Nov. 2, 2023

Related U.S. Application Data

(63) Continuation of application No. PCT/CN2021/143630, filed on Dec. 31, 2021.

(30) Foreign Application Priority Data

Jan. 4, 2021 (CN) ......................... 202110004611.3

(51) Int. Cl.
*H04W 72/566* (2023.01)
*H04W 72/1268* (2023.01)
*H04W 72/21* (2023.01)

(52) U.S. Cl.
CPC ....... *H04W 72/21* (2023.01); *H04W 72/1268* (2013.01); *H04W 72/566* (2023.01)

(58) Field of Classification Search
CPC ............. H04W 72/21; H04W 72/1268; H04W 72/566; H04W 72/02; H04W 72/56; H04W 72/569; H04W 72/23; H04W 72/0446; H04W 72/542; H04W 74/08; H04W 24/10; H04W 72/04; H04W 72/12; H04W 72/0453; H04W 72/232; H04W 28/0278; H04W 28/06; H04W 72/563; H04W 28/18; H04W 72/1263; H04W 72/541;

(Continued)

(56) References Cited

U.S. PATENT DOCUMENTS

| | | | | |
|---|---|---|---|---|
| 2019/0037586 | A1 | 1/2019 | Park et al. | |
| 2020/0187235 | A1* | 6/2020 | Wu | H04W 72/21 |
| 2022/0338211 | A1* | 10/2022 | Alabbasi | H04W 72/569 |

FOREIGN PATENT DOCUMENTS

| | | |
|---|---|---|
| CN | 111869302 A | 10/2020 |

OTHER PUBLICATIONS

Summary of email discussion [103-e-NR-7.1CRs-08]-phase 2, 3GPP TSG RAN WG1 #103e, e-Meeting, Oct. 26-Nov. 13, 2020, R1-2009774 (Year: 2020).*

(Continued)

*Primary Examiner* — Jing Gao
(74) *Attorney, Agent, or Firm* — IPX PLLC

(57) ABSTRACT

The application discloses a communication transmission method and apparatus and a communication device. The method includes: processing, by a communication device, a Physical Uplink Control CHannel (PUCCH) and at least one uplink data channel according to a predetermined processing method when the PUCCH overlaps with the at least one uplink data channel, where the PUCCH carries uplink control information (UCI).

20 Claims, 12 Drawing Sheets

(58) Field of Classification Search
CPC ... H04W 28/16; H04W 52/365; H04W 72/20; H04W 74/006; H04W 80/02; H04W 88/02; H04W 72/52; H04W 74/0808; H04W 80/08; H04W 72/231; H04W 72/535; H04W 72/543; H04W 52/146; H04W 72/1273; H04W 72/51; H04W 72/512; H04W 72/044; H04W 28/0268; H04W 76/15; H04W 74/004; H04L 5/0053; H04L 1/1812; H04L 1/0026; H04L 5/0057; H04L 1/1854; H04L 1/1861; H04L 1/0031
See application file for complete search history.

(56) References Cited

OTHER PUBLICATIONS

Summary of email discussion [103-e-NR-L1enh-URLLC-07], 3GPP TSG RAN WG1 Meeting #103-e, R1-2009684, e-Meeting, Oct. 26-Nov. 13, 2020 (Year: 2020).*
Intra-UE prioritization of UL Data Data, 3GPP TSG-RAN WG2 Meeting #106, R2-1907607, Reno, Nevada, USA, May 13-17, 2019 (Year: 2019).*
International Search Report issued in corresponding International Application No. PCT/CN2021/143630, mailed Mar. 23, 2022, 4 pages.
Moderatorvivo, "Summary of email discussion [103-e-NR-L1enh-URLLC-07]", 3GPP TSG RAN WG1 Meeting #103-e e-Meeting, R1-2009684, Nov. 2020, 35 pages.
Intel Corporation, "Intra UE prioritization of UL Data and Data", 3GPP TSG-RAN WG2 Meeting #106, R2-1907607, May 2019, 3 pages.
Huawei et al., "Summary of [AT112-e][041][IIOT] MAC I", 3GPP TSG-RAN WG2 Meeting #112-e, R2-2011058, Nov. 2020, 14 pages.
Extended European Search Report issued in related European Application No. 21914708.9, mailed Mar. 4, 2024, 17 pages.
Vivo, "Reply LS on Intra UE Prioritization Scenario", 3GPP Draft; R1-2009067, Oct. 2020, 5 pages.
Ntel Corporation: "Discussion on LS on intra-UE prioritization", 3GPP Draft; R1-2008866, Nov. 2020, 3 pages.
Moderator (VIVO): "Summary of email discussion [103-e-NR-7.1 CRs-08]-phase 2", 3GPP Draft; R1-2009774, Nov. 2020, 14 pages.

* cited by examiner

COMMUNICATION TRANSMISSION METHOD AND APPARATUS AND COMMUNICATION DEVICE

CROSS-REFERENCE OF RELATED APPLICATION

The present application is a continuation of International Application No. PCT/CN2021/143630, filed on Dec. 31, 2021, which claims priority to Chinese Patent Application No. 202110004611.3, filed on Jan. 4, 2021. The entire contents of each of the above-identified applications are expressly incorporated herein by reference.

TECHNICAL FIELD

The present application belongs to the technical field of wireless communication, and specifically relates to a communication transmission method and apparatus and a communication device.

BACKGROUND

In wireless communication-related technologies, if the UPlink transmission skipping (UL skipping) rule and the logical channel-based prioritization (lch-based Prioritization) rule are enabled or used at the same time, in a scenario in which Configured Grant (CG) and Dynamic Grant (DG) with a same priority/different priorities or CG and CG conflict with each other, it cannot be determined whether the terminal should use the UL skipping rule or the lch-based Prioritization rule, resulting in poor wireless communication performance.

SUMMARY

Embodiments of the present application provide a communication transmission method and apparatus and a communication device.

According to a first aspect, a communication transmission method is provided, and the method includes: processing, by a communication device, the PUCCH and the at least one uplink data channel according to a predetermined processing method when a physical uplink control channel PUCCH overlaps with at least one uplink data channel, where the PUCCH carries uplink control information UCI; and the predetermined processing method includes any one of the following: a first processing method, where the first processing method indicates that a priority of the uplink skipping UL skipping rule is higher than a priority of the logical channel-based Prioritization (lch-based Prioritization) rule; a second processing method, where the second processing method indicates that the priority of the lch-based Prioritization rule is higher than the priority of the UL skipping rule; a third processing method, where the third processing method indicates that a terminal determines whether to use the UL skipping rule or the lch-based Prioritization rule; and a fourth processing method, where the fourth processing method indicates that according to a configuration or scheduling method of a network side device, it is determined whether the UL Skipping rule or the lch-based Prioritization rule is used.

According to a second aspect, a communication transmission apparatus is provided, and the apparatus is configured to: process the PUCCH and the at least one uplink data channel according to a predetermined processing method when a physical uplink control channel PUCCH overlaps with at least one uplink data channel, where the PUCCH carries uplink control information UCI; and the predetermined processing method includes any one of the following: a first processing method, where the first processing method indicates that a priority of the uplink skipping UL skipping rule is higher than a priority of the logical channel-based Prioritization (lch-based Prioritization) rule; a second processing method, where the second processing method indicates that the priority of the lch-based Prioritization rule is higher than the priority of the UL skipping rule; a third processing method, where the third processing method indicates that a terminal determines whether to use the UL skipping rule or the lch-based Prioritization rule; and a fourth processing method, where the fourth processing method indicates that according to a configuration or scheduling method of a network side device, it is determined whether the UL Skipping rule or the lch-based Prioritization rule is used.

According to a third aspect, a communication device is provided, where the communication device includes a processor, a memory, and a program or an instruction stored in the memory and executable on the processor, and when the program or the instruction is executed by the processor, the steps of the communication transmission method according to the first aspect are implemented.

According to a fourth aspect, a readable storage medium is provided. The readable storage medium stores a program or an instruction, and the program or the instruction is executed by a processor to implement the steps of the method according to the first aspect.

According to a fifth aspect, a chip is provided. The chip includes a processor and a communications interface, the communications interface is coupled to the processor, and the processor is configured to run a program or an instruction of a network side device to implement steps of the method according to the first aspect.

In a sixth aspect, a computer program product is provided. The computer program product includes a processor, a memory, and a program or an instruction that is stored in the memory and that can run on the processor, where when the processor or the instruction is executed by the processor, the steps of the method according to the first aspect are implemented.

In the embodiments of the present application, when the PUCCH overlaps with at least one uplink data channel, the PUCCH and the at least one uplink data channel are processed according to a predetermined processing method, and the PUCCH carries uplink control information UCI.

DETAILED DESCRIPTION

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first," "second," and the like in the description and the claims of this application are used to distinguish between similar objects, and do not need to be used to describe a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, a New Radio (NR) system is described in the following description for illustrative purposes, and the NR terminology is used in most of the following description, although these technologies can also be applied to applications other than the NR system application, such as the $6^{th}$ Generation (6G) communication system.

Figure 1:
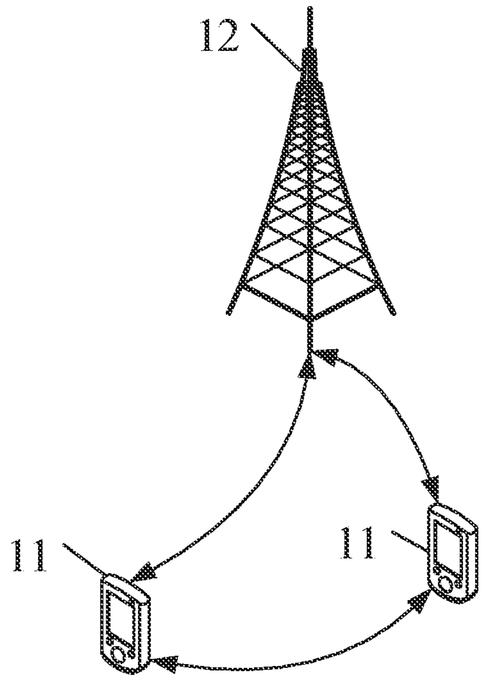
FIG. 1 is a schematic structural diagram of a wireless communication system provided by an exemplary embodiment of the present application.

FIG. 1 is a schematic diagram of a wireless communication system to which this embodiment of the present application is applicable. The wireless communications system includes a terminal 11 and a network side device 12. The terminal 11 may also be called a terminal device or User Equipment (UE), and the terminal 11 may be a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device or a Vehicle User Equipment (VUE), a Pedestrian User Equipment (PUE), and other terminal side devices. The wearable device includes: bracelets, earphones, glasses, etc. It should be noted that a specific type of the terminal 11 is not limited in the embodiments of this application. The network side device 12 may be a base station or a core network. The base station may be referred to as a node B, an evolved node B, an access point, a Base Transceiver Station (BTS), a radio base station, a radio transceiver, a Basic Service Set (BSS), an Extended Service Set (ESS), a node B, an evolved node B (eNB), a home node B, a home evolved node B, a Wireless Local Area Network (WLAN) access point, a Wireless Fidelity (WiFi) node, a Transmitting Receiving Point (TRP), or other appropriate terms in the art. As long as a same technical effect is achieved, the base station is not limited to a specified technical term. It should be noted that, in embodiments of the present application, only a base station in the NR system is used as an example, but a specific type of the base station is not limited.

With reference to the accompanying drawings, the technical solutions provided in the embodiments of this application are described in detail by using specific embodiments and application scenarios.

Figure 2:
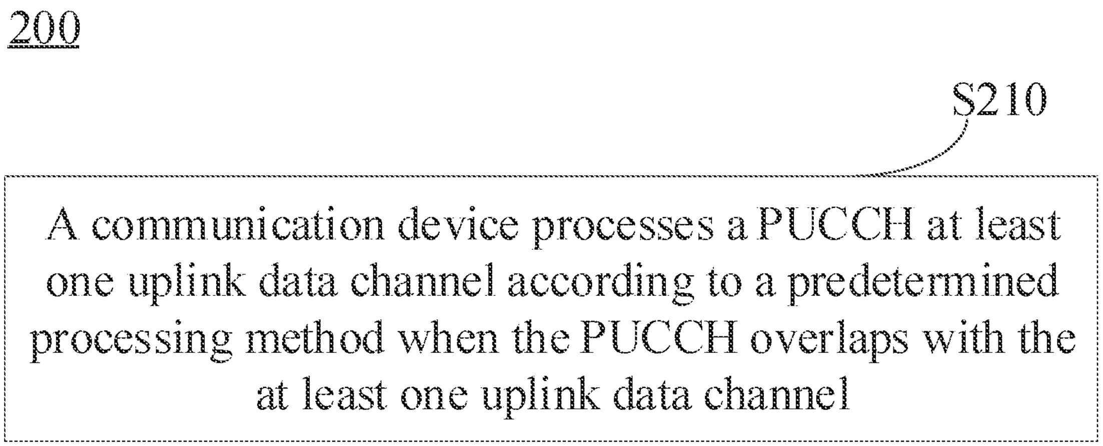
FIG. 2 is a flowchart of a communication transmission method provided by an exemplary embodiment of the present application.

FIG. 2 is a schematic flowchart of a communication transmission method provided by an exemplary embodiment of the present application. The method 200 can be executed by a communication device, such as a terminal or a network side device, and can be specifically implemented by software and/or hardware in the communication device, the method 200 may include the following steps.

S210: A communication device processes a Physical Uplink Control CHannel (PUCCH) and at least one uplink data channel according to a predetermined processing method when the PUCCH overlaps with the at least one uplink data channel.

The PUCCH may carry Uplink Control Information (UCI). The uplink data channel may include a Physical Uplink Shared CHannel (PUSCH) of DG and/or a PUSCH of CG, which is not limited in this embodiment.

In an implementation, the PUCCH carrying UCI may overlap with the at least one uplink data channel, for example, the PUCCH overlaps with the PUSCH of the CG or the PUSCH of the DG. In some implementations, while the PUCCH carrying UCI overlaps with at least one uplink data channel, a part of uplink data channel in the at least one uplink data channel overlaps with each other. In some implementations, the PUCCH carrying UCI simultaneously overlaps with multiple uplink data channels. The channel overlapping may also be understood as channel resource conflict and the like.

Correspondingly, for the channel overlapping scenario, the PUCCH has the same priority as that of the at least one uplink data channel; or the PUCCH has a priority different from that of the at least one uplink data channel. The priority may include but is not limited to a priority of a physical layer and/or a priority based on a logical channel, the priority of the physical layer may be indicated by the L1 priority indicator, and the priority based on the logical channel is used to represent a priority of the Medium Access Control (MAC), which is not specifically limited in this embodiment.

In addition, for the channel overlap scenario, the communication device (such as a terminal or a network-side device) may process according to a predetermined processing method, so that it can be determined whether the communication device uses the UL skipping rule or the lch-based Prioritization rule, or a rule whose corresponding Medium Access Control Protocol Data Unit (MAC PDU) is generated can be determined, and it can be determined whether a MAC PDU that is not generated participates in the subsequent UCI multiplexing process, or the like, to ensure the smooth execution of the wireless communication process and improve the wireless communication performance.

It should be noted that the UL skipping rule described in this embodiment can be understood as: even if the terminal is configured with a function corresponding to the UL skipping rule (that is, when there is no valid uplink data on the terminal side, the terminal does not generate a MAC PDU and does not send an uplink data channel), when the terminal currently has no valid data for the uplink data channel, if there is a resource conflict between the uplink data channel and the control channel carrying uplink control information, the terminal must generate a MAC PDU and send an uplink data channel multiplexing UCI.

The lch-based Prioritization rule can be understood as: when channel resources allocated for different priority data channels overlap with each other, a MAC PDU corresponding to a high-priority data channel is preferentially generated, and the high-priority data channel is sent, such as a high-priority PUSCH or a high-priority PUCCH.

On the basis of the foregoing, as an implementation manner, the predetermined processing method may include any one of the following (1) to (4).

(1) A first processing method, where the first processing method indicates that a priority of the UL skipping rule is higher than a priority of the lch-based Prioritization rule.

In this case, the communication device may determine to prioritize the UL skipping rule, generate a MAC PDU corresponding to the UL skipping rule, or the like, and process the PUCCH and at least one uplink data channel based on the UL skipping rule and/or the MAC PDU corresponding to the UL skipping rule.

(2) A second processing method, where the second processing method indicates that the priority of the lch-based Prioritization rule is higher than the priority of the UL skipping rule.

In this case, the communication device may determine to prioritize the lch-based Prioritization rule, generate a MAC PDU corresponding to the lch-based Prioritization rule, or the like, and process the PUCCH and at least one uplink data channel based on the lch-based Prioritization rule and/or the MAC corresponding to the lch-based Prioritization rule.

(3) A third processing method, where the third processing method indicates that the terminal determines to use the UL Skipping rule or the lch-based Prioritization rule.

In this case, the communication device may determine, according to the implementation of the terminal, whether to prioritize the lch-based Prioritization rule or the UL skipping rule. For example, if the communication device is a terminal, the terminal may respond to a user operation to determine whether to prioritize the lch-based Prioritization rule or the UL skipping rule.

(4) A fourth processing method, where the fourth processing method indicates to determine, according to a configuration or scheduling manner of the network side device, whether to use the UL Skipping rule or the lch-based Prioritization rule.

In this case, the communication device may determine, according to the network side device, whether to use the lch-based Prioritization rule or the UL skipping rule, that is, if the communication device is a terminal, the terminal may function, according to a configuration or scheduling manner of the network side device, such that the UL Skipping rule and the lch-based Prioritization rule are not enabled or used at the same time to solve the problem of channel resource overlapping. Otherwise, it is regarded as an error case.

For example, if the network side device determines that the lch-based Prioritization rule is preferentially used, the network side device can only configure the lch-based Prioritization rule for the terminal, so that the terminal can only use the lch-based Prioritization rule for processing; if the network side device determines that the UL Skipping rule is preferentially used, the network side device can only configure the UL Skipping rule for the terminal, so that the terminal can only use the UL Skipping rule for processing.

In some implementations, if the PUCCH overlaps with at least one uplink data channel, the priority of the PUCCH is the same as those of these overlapping uplink data channels, the uplink data channel does not have resource overlapping with other uplink data channels of different priorities, and the UL Skipping rule is used; if the uplink data channel does not have resource overlapping with other uplink data channels of different priorities, these uplink data channels do not have resource overlapping with the PUCCH, and the lch-based Prioritization rule is used.

It can be understood that when the communication device performs channel overlap processing, this can only be implemented according to any one of the aforementioned (1) to (4), or can be implemented according to two or more of the aforementioned (1) to (4). When implementing according to two or more of (1) to (4), each implementation manner can be configured with a corresponding priority, so that the communication device can process the channel overlapping problem according to the priority of each implementation manner, which will not be repeated in this embodiment.

In the embodiments, when the PUCCH overlaps with at least one uplink data channel, the PUCCH and the at least one uplink data channel may be processed according to a predetermined processing method, and the PUCCH carries uplink control information UCI. Therefore, it can solve the related-art problem that it cannot be determined whether the terminal uses the UL skipping rule or the lch-based Prioritization rule, and effectively improve the wireless communication performance.

Figure 3:
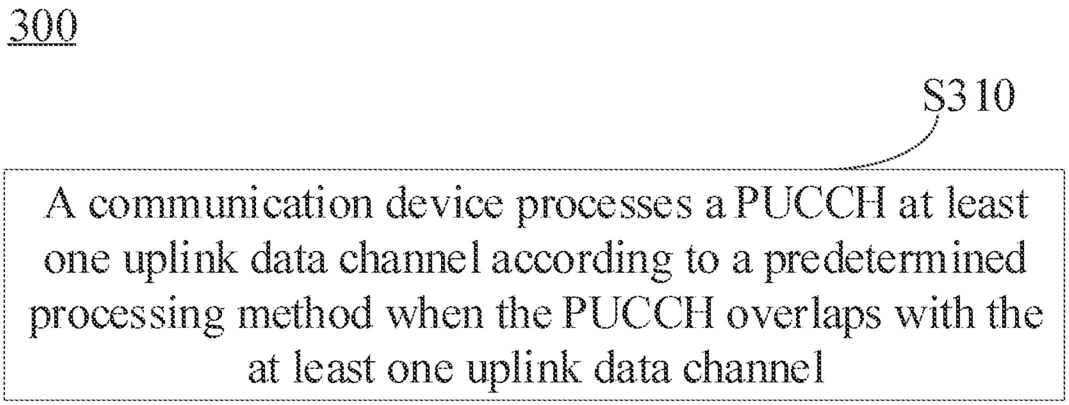
FIG. 3 is a flowchart of a communication transmission method provided by an exemplary embodiment of the present application.

FIG. 3 is a schematic flowchart of a communication transmission method provided by an exemplary embodiment of the present application. The method 300 can be executed by a communication device, such as a terminal or a network side device, and can be specifically implemented by software and/or hardware in the communication device, the method 300 may include the following steps.

S310: A communication device processes a PUCCH at least one uplink data channel according to a predetermined processing method when the PUCCH overlaps with the at least one uplink data channel.

The PUCCH carries UCI. In addition, for the implementation of S310, refer to the relevant description in the aforementioned method 200. As an implementation manner, the implementation process of S310 is different according to different predetermined processing methods. The following uses different examples to describe the implementation process of S310.

Example 1

When the predetermined processing method is the first processing method (that is, the priority of the UL skipping rule is higher than the priority of the lch-based Prioritization rule), a process in which the communication device may process the PUCCH and the at least one uplink data channel according to the predetermined processing method may include: selecting a first uplink data channel from the at least one uplink data channel according to a pre-configured UCI multiplexing rule, and multiplexing, on the first uplink data channel, the UCI carried on the PUCCH.

The UCI multiplexing rule may include at least one of the following (1) to (5).

(1) A first priority rule used to indicate that an uplink data channel carrying an Aperiodic Channel State Information (A-CSI) report is prioritized.

(2) A second priority rule used to indicate that an uplink data channel of DG is prioritized over an uplink data channel of CG, and an uplink data channel of the CG is prioritized over an uplink data channel carrying a Semi-Persistent CSI (SP-CSI) report.

(3) A third priority rule used to indicate that an uplink data channel with a smaller carrier index (CC index) is prioritized over an uplink data channel with a larger carrier index.

(4) A fourth priority rule used to indicate that an uplink data channel with an earlier transmission time is prioritized over an uplink data channel with a later transmission time.

(5) A fifth priority rule used to indicate that an uplink data channel with a smaller CG index is prioritized over an uplink data channel with a larger CG index. In an implementation manner, for multiple conflicting CGs on the same carrier, a CG with the smallest index among the multiple CGs may be prioritized.

It can be understood that in the aforementioned implementation manner, the communication device selects, according to the UCI multiplexing rule, a PUSCH (such as the first uplink data channel) for multiplexing, where the PUCCH and the PUSCH may use the same numerology, that is, the PUCCH and the PUSCH may have a same SubCarrier Spacing (SCS).

In addition, the present embodiment adopts the aforementioned implementation manner, the communication device can generate a MAC PDU having a resource conflict with the PUCCH, and can multiplex, on the PUSCH, the UCI carried on the PUCCH for transmission.

Example 2

When the predetermined processing method is the first processing method, the processing procedure of processing a PUCCH and at least one uplink data channel according to a predetermined processing method may further include: executing a first behavior when a first condition is met; where the first condition may include at least one of the following (1) to (6).

(1) The MAC layer is configured with a lch-based Prioritization parameter, which can also be understood as enabling the lch-based Prioritization rule while enabling the UL skipping rule.

(2) DG for scheduling the at least one uplink data channel is scrambled by a target scrambling code. The target scrambling code may include but is not limited to a user-specific Radio Network Temporary Identity (RNTI) scrambling code, such as a Temporary Cell RNTI (TC-RNTI), a Cell Radio Network Temporary Identifier (C-RNTI), a Modulation and Coding Scheme (MCS)-C-RNTI, and a Configuration Scheduling RNTI (CS-RNTI).

(3) The DG that schedules the at least one uplink data channel is used for the first transmission, that is, the DG that schedules the at least one uplink data channel is used for new transmission, instead of retransmission.

(4) The CG that schedules the at least one uplink data channel is submitted to a Hybrid Automatic Repeat reQuest (HARQ) entity.

(5) No MAC PDU is generated for the CG for scheduling the at least one uplink data channel.

(6) UCI carried on the PUCCH is multiplexed on the at least one uplink data channel.

Correspondingly, the first behavior may include at least one of the following (1) to (3).

(1) Determine that a priority of the first uplink grant is higher than a priority of the second uplink grant.

(2) Determine that the second uplink grant is a deprioritized uplink grant.

In the foregoing (1) and (2), the first uplink grant may be the DG or CG corresponding to the second uplink data channel, the second uplink data channel is a channel multiplexed with UCI among the at least one uplink data channel, the second uplink grant is CG or DG corresponding to a third uplink data channel, and the third uplink data channel is a channel overlapping with the second uplink data channel among the at least one uplink data channel. On this basis, the corresponding MAC PDU can be further generated according to the prioritized uplink grant (such as the first uplink grant).

(3) Determine that the first scheduling request is a deprioritized scheduling request, where the first Scheduling Request (SR) is a scheduling request for scheduling the at least one uplink data channel.

It can be understood that the first condition may include one or more of the aforementioned (1) to (6), and correspondingly, the first behavior may also include one or more of the aforementioned (1) to (3), which is not limited in this embodiment.

In an implementation manner, the executing the first behavior according to the first condition may further include: when uplink data channels of at least two CGs overlap in the at least one uplink data channel and UCI is multiplexed on the uplink data channels of the CGs, determining a target uplink grant according to a sixth priority rule; where the target uplink grant is any one of the at least two CGs, and a priority of the target uplink grant is higher than those of other uplink grants of the at least two CGs other than the target uplink grant;

where the sixth priority rule may include at least one of the following (1) to (3).

(1) A priority of a CG corresponding to an uplink data channel with an earlier transmission time is higher than a priority of a CG corresponding to an uplink data channel with a later transmission time.

(2) A CG with a smaller index is prioritized over a CG with a larger index.

(3) The terminal determines the target uplink grant of the at least two CGs. For example, if there are at least two CGs and a duration of PUSCHs multiplexed with UCI overlap with that for transmitting the multiplexed UCI by all these PUSCHs, it depends on implementation of the terminal, for example, the terminal selects the PUSCH of the target CG.

It should be noted that, in example 2, when the predetermined processing method is the first processing method, the process of executing the first behavior by the communication device according to the first condition occurs at the MAC layer, and the MAC layer may interact with the behavior performed at the physical layer or information generated in example 1, which is not described in this embodiment.

Example 3

When the predetermined processing method is the second processing method, the processing a PUCCH and at least one uplink data channel according to a predetermined processing method includes any one of the following (1) or (2):

(1) A first PDU that is not generated participates in a UCI multiplexing process.

The first MAC PDU is the MAC PDU corresponding to the at least one uplink data channel, that is, the MAC PDU corresponding to the UL Skipping rule is not generated, and correspondingly, the UCI carried by the PUCCH is discarded along with the MAC PDU that is not generated. The UCI multiplexing process may be a multiplexing process between the UCI carried on the PUCCH and the at least one uplink data channel.

(2) A first MAC PDU that is not generated does not participate in a UCI multiplexing process.

In an implementation manner, that the first MAC PDU that is not generated does not participate in the UCI multiplexing process includes the following (2a) or (2b).

(2a) When there is no resource conflict between the PUCCH and the first MAC PDU that is not generated, the UCI is transmitted through the PUCCH.

(2b) When there is a resource conflict between the PUCCH and the first MAC PDU that is not generated, the UCI carried on the PUCCH is discarded or transmitted.

In another implementation, whether the first MAC PDU that is not generated participates in or does not participate in the UCI multiplexing process is determined according to a specified processing time; where the specified processing time includes a first processing time and/or a second processing time, the first processing time is used to indicate a time when UCI is multiplexed on the PUSCH and can be expressed as $$T_{proc,x}^{mux},$$

where x=1, 2, or Downlink Control Information (DCI), DCI can be release or the like, and the second processing time is used to indicate a time when the MAC layer determines whether to generate a DG MAC PDU or a CG MAC PDU and can be expressed as $$T_{proc}^{pri}.$$

In this embodiment, the determining, according to a specified processing time, whether the MAC PDU that is not generated participates in or does not participate in the UCI multiplexing process includes the following (1) or (2).

(1) When a third processing time is earlier than a fourth processing time, the first MAC PDU that is not generated does not participate in the UCI multiplexing process.

(2) When the third processing time is not earlier than the fourth processing time, the first MAC PDU that is not generated participates in the UCI multiplexing process.

In the foregoing (1) and (2), the third processing time may be determined according to the first time and the second processing time, and the first time is a time corresponding to a start symbol of the CG; and the fourth processing time is determined according to the first processing time and the second time, the second time is a time corresponding to the first symbol of a target channel, and the target channel is a channel earlier transmitted in the PUCCH and the at least one uplink data channel.

In an implementation manner, assuming that the third processing time is T1, the first time is S1, the fourth processing time is T2, and the second time is S0, $$T1 = S1 - T_{proc}^{pri},$$

$$T2 = S0 - T_{proc,x}^{mux}.$$

Example 4

When the predetermined processing method is the second processing method, processing the PUCCH and at least one uplink data channel according to the predetermined processing method includes; when the first MAC PDU is generated and the UCI carried on the PUCCH is multiplexed and transmitted on an uplink data channel corresponding to the first MAC PDU, the requirement of the first processing time is met, and the first processing time indicates a time when UCI is multiplexed on the uplink data channel. The UCI carried on the PUCCH may be multiplexed and transmitted on the PUSCH corresponding to the first MAC PDU by specifying by the base station or based on a pre-configured multiplexing rule.

For the first processing time, refer to the foregoing description, and in order to avoid repetition, details are not repeated herein.

Example 5

When the predetermined processing method is the fourth processing method, the processing the PUCCH and the at least one uplink data channel according to the predetermined processing method includes; the first MAC PDU that is not generated does not participate in the UCI multiplexing process.

For the introduction that the first MAC PDU that is not generated does not participate in the UCI multiplexing process, refer to the above, and details are not repeated herein.

Based on the description of the foregoing methods 200 and 300, the implementation process of the communication transmission method provided in the present application will be further introduced below with reference to FIG. 4*a* to FIG. 4*i*, and the content is as follows. HP means high priority, and LP means low priority.

Figure 4A:
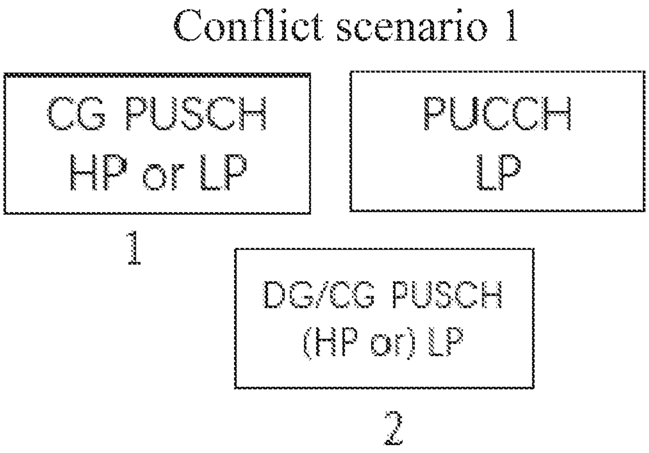
FIG. 4*a* to FIG. 4*v* are respectively schematic diagrams of communication transmission processes in different channel overlapping scenarios provided by the present application.

(1) As shown in FIG. 4*a*, when the LP PUCCH carrying UCI overlaps with the CG PUSCH (corresponding to "1" shown in FIG. 4*a*), the PUCCH and the PUSCH can be performed according to FIG. 4*b* to FIG. 4*g*.

Figure 4B:
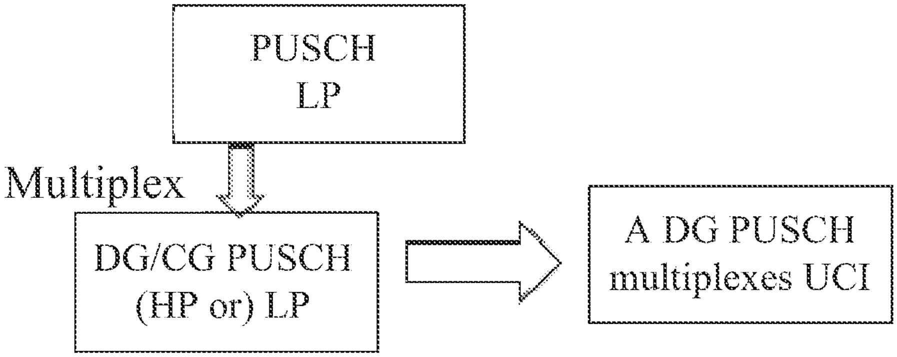

In FIG. 4*b*, when the first processing method (that is, prioritizing the UL Skipping rule) or the fourth processing method is used and the network layer device only configures the UL skipping rule for the terminal, DG/CG PUSCH can be generated (corresponding to "2" shown in FIG. 4*a*), without generating CG PUSCH (corresponding to "1" shown in FIG. 4*a*), and the UCI carried on the PUCCH is multiplexed to the DG/CG PUSCH.

Figure 4C:
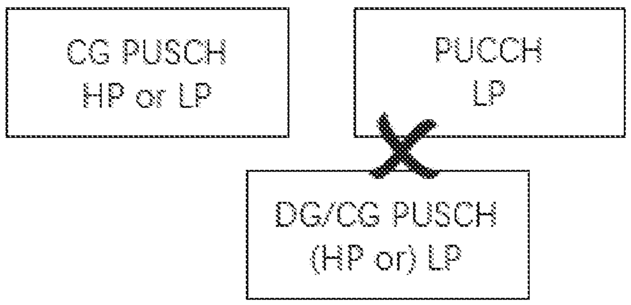

In FIG. 4*c*, in a case of using the second processing method (that is, prioritizing lch-basedPrioritization rule), a high-priority CG PUSCH is generated (corresponding to "1"

shown in FIG. 4*a*), and a low-priority DG/CGPUSCH is not generated (corresponding to "2" shown in FIG. 4*a*), and the UCI carried on the PUCCH is discarded or transmitted.

Figure 4D:
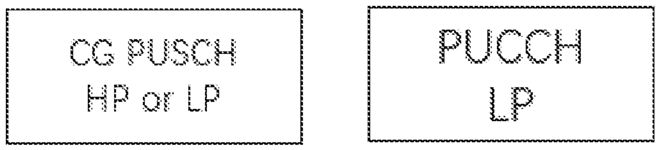

In FIG. 4*d*, when the second processing method (that is, prioritizing the lch-based Prioritization rule) or the fourth processing method is used, and the network layer device only configures the lch-based Prioritization rule for the terminal, a high-priority CG PUSCH is generated (corresponding to "1" shown in FIG. 4*a*), and a low-priority DG/CG PUSCH is not generated (corresponding to "2" shown in FIG. 4*a*). The reason is: because there is no resource conflict between the high-priority CG PUSCH and the PUCCH, the PUCCH can also be transmitted.

Figure 4E:
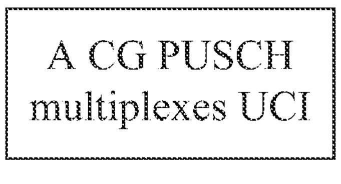

In FIG. 4*e*, when the second processing method (that is, prioritizing the lch-based Prioritization rule) or the fourth processing method is used, and the network layer device only configures the lch-based Prioritization rule for the terminal, a high-priority CG PUSCH is generated (corresponding to "1" shown in FIG. 4*a*), and a low-priority DG/CG PUSCH is not generated (corresponding to "2" shown in FIG. 4*a*). If there is a resource conflict between the high-priority CG PUSCH and the PUCCH, or regardless of whether there is a resource conflict between the CG PUSCH and the PUCCH, the UCI carried on the PUCCH is multiplexed on the CGPUSCH for transmission.

Figure 4F:
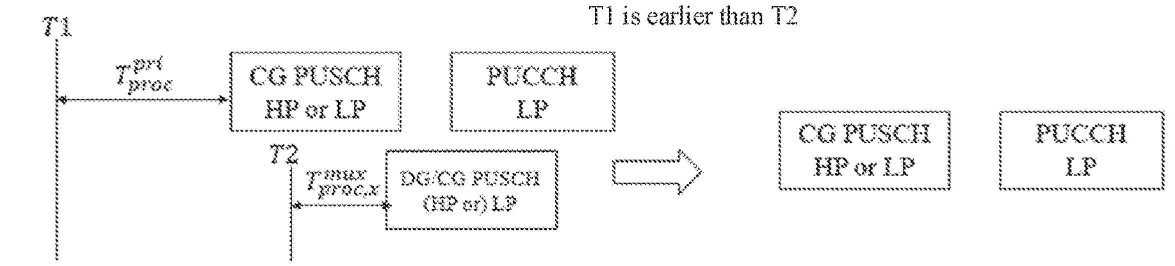
Figure 4G:
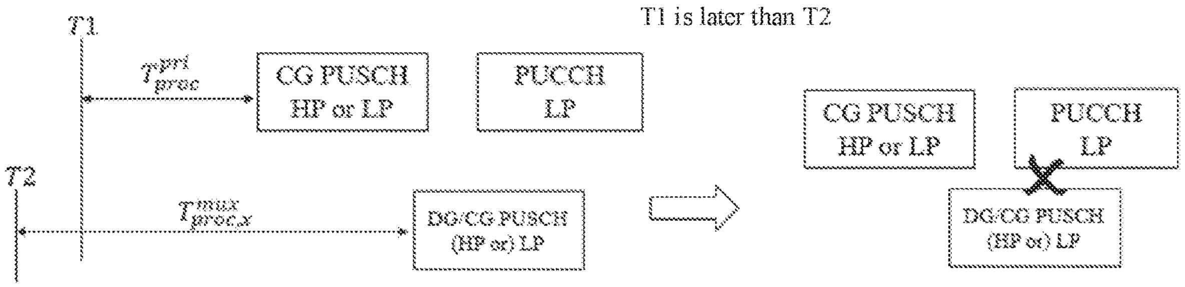

In FIG. 4*f* and FIG. 4*g*, in the case of using the second processing method (that is, prioritizing the lch-basedPrioritization rule), the deadline for deciding UCI multiplexing is T2 that is earlier than the deadline T1 for deciding to generate a high priority (that is, T1 is later than or equal to T2 in time). Therefore, the low-priority DG/CG PUSCH is not generated (corresponding to "2" shown in FIG. 4*a*), and the PUCCH is discarded.

Figure 4H:
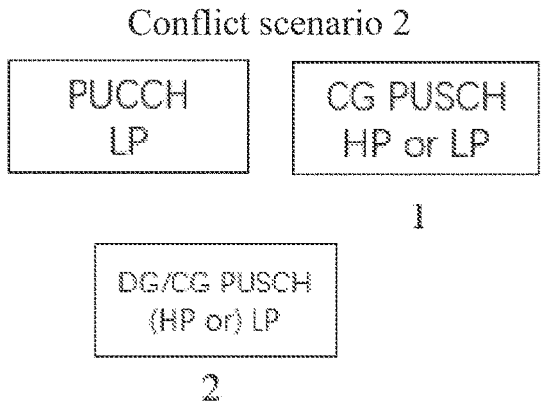

(2) As shown in FIG. 4*h*, when there is channel overlapping between the PUCCH carrying UCI and DG/CG PUSCH (corresponding to "2" shown in FIG. 4*a*), the PUCCH and the PUSCH can be processed according to FIG. 4*i* to FIG. 4*n*.

Figure 4I:
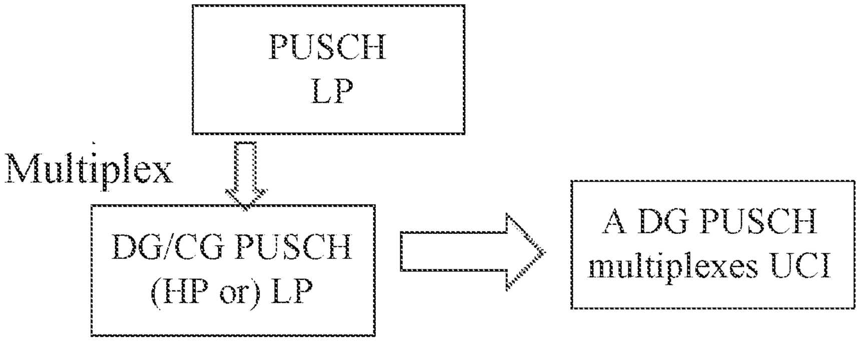

In FIG. 4*i*, when the first processing method (that is, prioritizing the UL Skipping rule) or the fourth processing method is used and the network layer device only configures the UL skipping rule for the terminal, DG/CG PUSCH can be generated (corresponding to "2" shown in FIG. 4*a*), without generating CG PUSCH (corresponding to "1" shown in FIG. 4*h*), and the UCI carried on the PUCCH is multiplexed to the DG/CG PUSCH.

Figure 4J:
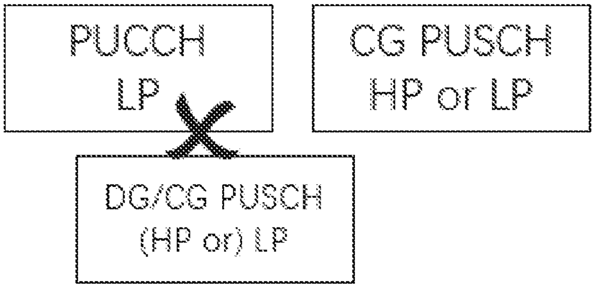

In FIG. 4*j*, in a case of using the second processing method (that is, prioritizing lch-basedPrioritization rule), a high-priority CG PUSCH is generated (corresponding to "1" shown in FIG. 4*h*), and a low-priority DG/CGPUSCH is not generated (corresponding to "2" shown in FIG. 4*h*), and the UCI carried on the PUCCH is discarded or transmitted.

Figure 4K:

In FIG. 4*k*, when the second processing method or the fourth processing method is used, and the network layer device only configures the lch-based Prioritization rule for the terminal, a high-priority CG PUSCH is generated (corresponding to "1" shown in FIG. 4*h*), and a low-priority DG/CG PUSCH is not generated (corresponding to "2" shown in FIG. 4*h*). The reason is: because there is no resource conflict between the high-priority CG PUSCH and the PUCCH, the PUCCH can also be transmitted.

Figure 4L:
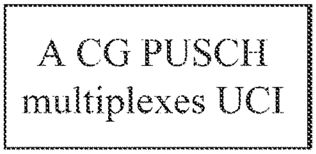

In FIG. 4*l*, when the second processing method or the fourth processing method is used, and the network layer device only configures the lch-based Prioritization rule for the terminal, a high-priority CG PUSCH is generated (corresponding to "1" shown in FIG. 4*h*), and a low-priority DG/CG PUSCH is not generated (corresponding to "2" shown in FIG. 4*h*). If there is a resource conflict between the high-priority CG PUSCH and the PUCCH, or regardless of whether there is a resource conflict between the CG PUSCH and the PUCCH, the UCI carried on the PUCCH is multiplexed on the CGPUSCH for transmission.

Figure 4M:
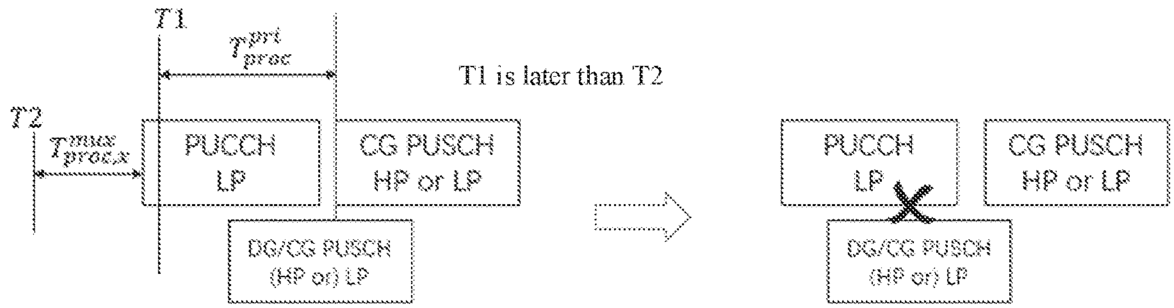
Figure 4N:
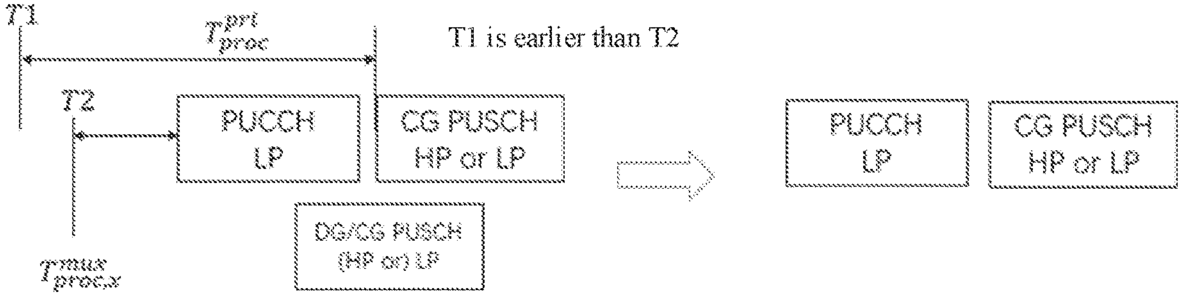

In FIG. 4*m* and FIG. 4*n*, in the case of using the second processing method, the deadline for deciding UCI multiplexing is T2 that is earlier than the deadline T1 for deciding to generate a high priority (that is, T1 is later than or equal to T2 in time). Therefore, the low-priority DG/CG PUSCH is not generated (corresponding to "2" shown in FIG. 4*h*), and the PUCCH is discarded.

Figure 4O:
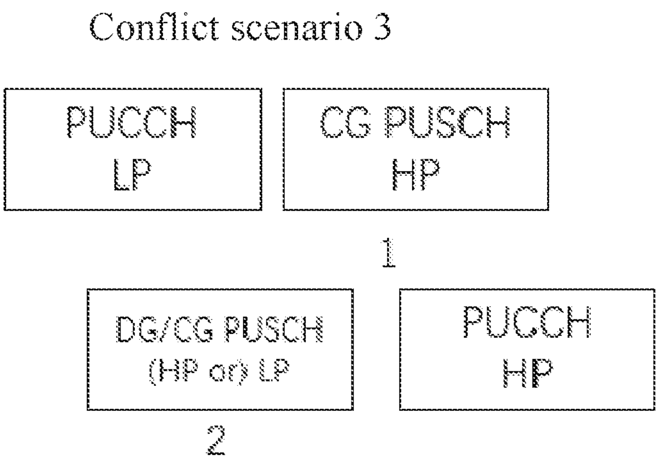

(3) As shown in FIG. 4*o*, when there is channel overlapping between the low-priority (LP) PUCCH LP and the DG/CG PUSCH (corresponding to "2" shown in FIG. 4*o*), and there is channel overlapping between the high-priority (HP) PUCCH and the CG PUSCH (corresponding to "1" shown in FIG. 4*o*), the PUCCH and the PUSCH can be processed according to FIG. 4*p* to FIG. 4*v*.

Figure 4P:
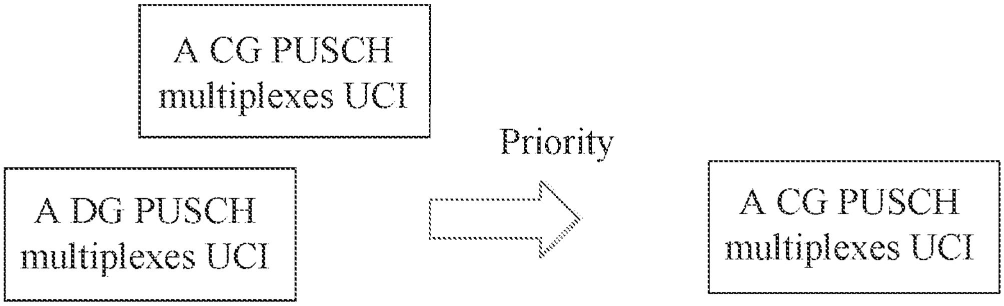
Figure 4Q:
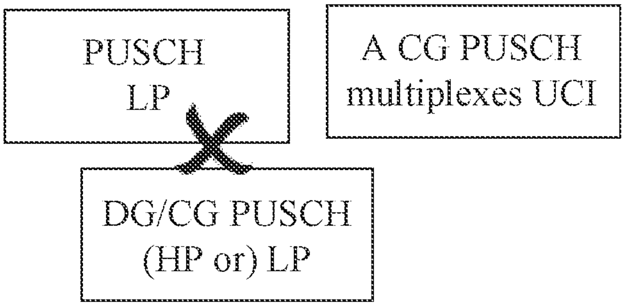

In FIG. 4*p*, when the first processing method (that is, prioritizing the UL Skipping rule) or the fourth processing method is used and the network layer device only configures the UL skipping rule for the terminal, a CG PUSCH can be generated (corresponding to "1" shown in FIG. 4*o*), and a DG/CG PUSCH (corresponding to "2" shown in FIG. 4*o*) can be generated. However, since the priority of the CG PUSCH is higher than the priority of the DG/CG PUSCH, the UCI on the PUCCH can be multiplexed and transmitted on the CG PUSCH.

Figure 4R:
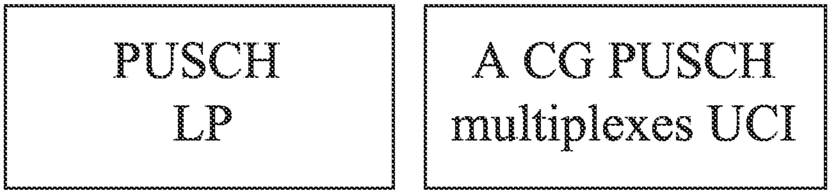
Figure 4S:
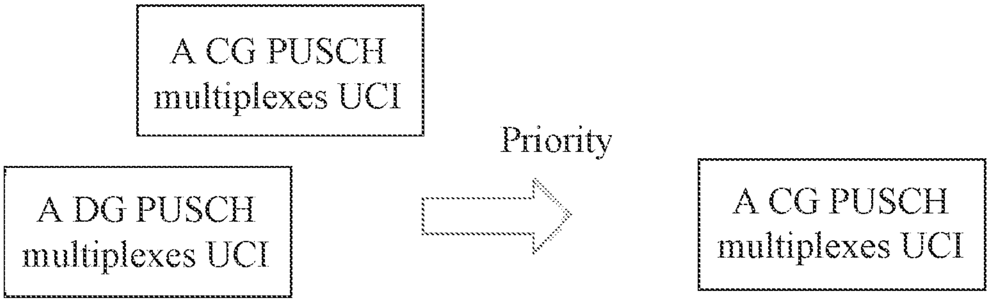

In FIG. 4*s*, in a case of using the second processing method (that is, prioritizing lch-basedPrioritization rule), a high-priority CG PUSCH is generated (corresponding to "I" shown in FIG. 4*o*), and a low-priority DG/CGPUSCH is not generated (corresponding to "2" shown in FIG. 4*o*), and the UCI carried on the low-priority PUCCH is discarded or transmitted.

In FIG. 4*r*, when the second processing method or the fourth processing method is used, and the network layer device only configures the lch-based Prioritization rule for the terminal, a high-priority CG PUSCH is generated (corresponding to "1" shown in FIG. 4*o*), and a low-priority DG/CG PUSCH is not generated (corresponding to "2" shown in FIG. 4*o*). The reason is: because there is no resource conflict between the high-priority CG PUSCH and the low-priority PUCCH, the PUCCH can also be transmitted, and the UCI carried on the high-priority PUCCH can be multiplexed on the CG PUSCH.

Figure 4T:
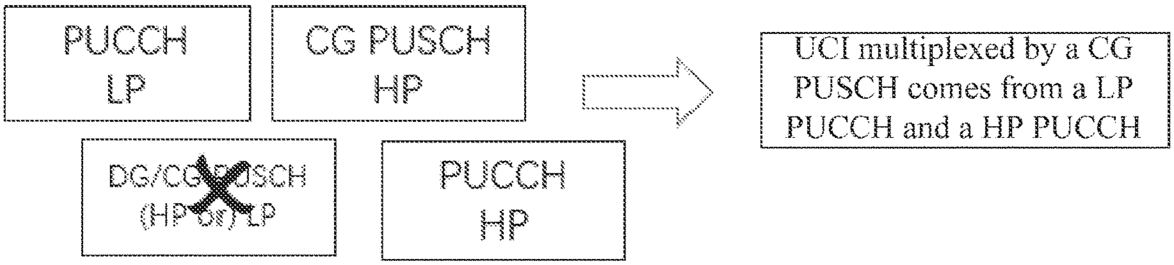

In FIG. 4*t*, when the second processing method or the fourth processing method is used, and the network layer device only configures the lch-based Prioritization rule for the terminal, a high-priority CG PUSCH is generated (corresponding to "1" shown in FIG. 4*o*), and a low-priority DG/CG PUSCH is not generated (corresponding to "2" shown in FIG. 4*o*). Both the UCI carried on the PUCCH LP and the UCI carried on the PUCCH HP are multiplexed on the CG PUSCH for transmission.

Figure 4U:
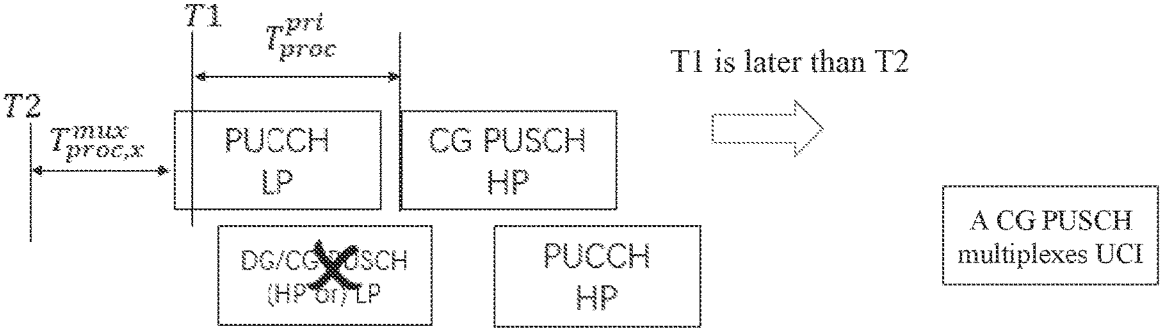
Figure 4V:
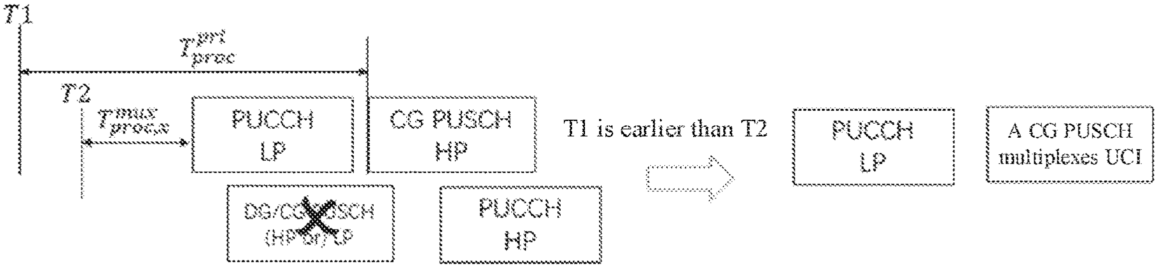

In FIG. 4*u* and FIG. 4*v*, in the case of using the second processing method, the deadline for deciding UCI multiplexing is T2 that is earlier than the deadline T1 for deciding to generate a high-priority PUSCH (that is, T1 is later than or equal to T2 in time). Therefore, the low-priority DG/CG PUSCH is not generated (corresponding to "2" shown in FIG. 4*o*), and the PUCCH is discarded. In the foregoing communication transmission method given in this embodiment, high-priority UCI is multiplexed on a low-priority data channel, or low-priority UCI is multiplexed on a high-priority data channel, or mixed (high+low)-priority UCI is multiplexed on the low-priority uplink data channel, or mixed (high+low)-priority UCI is multiplexed on the high-priority uplink data channel, thereby avoiding unnecessary UCI discarding, protecting the transmission of high-priority data, and improving wireless communication performance.

It should be noted that, the communication transmission method provided in the embodiments of the present application may be executed by a communication transmission apparatus, or a control module in the communication transmission apparatus for executing the communication transmission method. In the subsequent embodiments of the present application, the communication transmission apparatus provided in the embodiments of the present application is described by using an example in which the communication transmission method is performed by the communication transmission apparatus.

Figure 5:
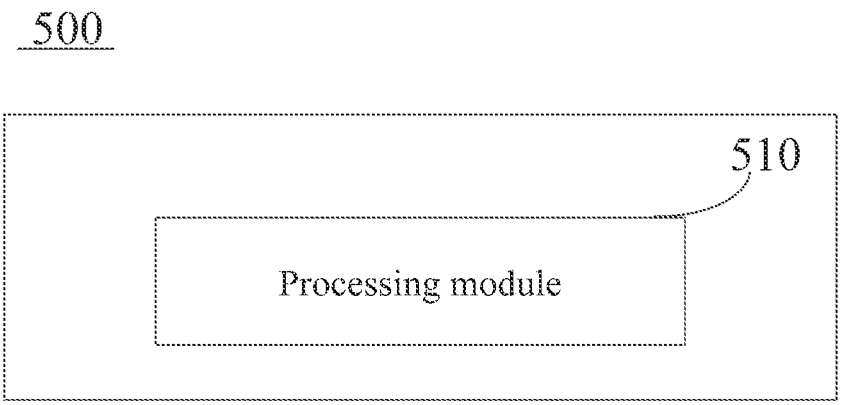
FIG. 5 is a schematic block diagram of a wireless communication device provided by an exemplary embodiment of the present application.

FIG. 5 is a schematic diagram of a block structure of a communication transmission apparatus 500 provided by an exemplary embodiment of the present application. The communication transmission apparatus 500 includes: a processing module 510 configured to: process the PUCCH and the at least one uplink data channel according to a predetermined processing method when a physical uplink control channel PUCCH overlaps with at least one uplink data channel, where the PUCCH carries uplink control information UCI; and the predetermined processing method includes any one of the following: a first processing method, where the first processing method indicates that a priority of the uplink skipping UL skipping rule is higher than a priority of the logical channel-based Prioritization (lch-based Prioritization) rule; a second processing method, where the second processing method indicates that the priority of the lch-based Prioritization rule is higher than the priority of the UL skipping rule; a third processing method, where the third processing method indicates that a terminal determines whether to use the UL skipping rule or the ich-based Prioritization rule; and a fourth processing method, where the fourth processing method indicates that according to a configuration or scheduling method of a network side device, it is determined whether the UL Skipping rule or the lch-based Prioritization rule is used.

In an implementation manner, a part of uplink data channel in the at least one uplink data channel overlaps with each other.

In another implementation manner, the processing module being configured to: when the predetermined processing method is the first processing method, process a PUCCH and at least one uplink data channel according to a predetermined processing method includes: selecting a first uplink data channel from the at least one uplink data channel according to a pre-configured UCI multiplexing rule, and multiplexing, on the first uplink data channel, the UCI carried on the PUCCH.

In another implementation manner, the UCI multiplexing rule includes at least one of the following: a first priority rule used to indicate that an uplink data channel carrying an A-CSI report is prioritized; a second priority rule used to indicate that an uplink data channel of DG is prioritized over an uplink data channel of CG, and an uplink data channel of the CG is prioritized over an uplink data channel carrying a SP-CSI report; a third priority rule used to indicate that an uplink data channel with a smaller carrier index is prioritized over an uplink data channel with a larger carrier index; a fourth priority rule used to indicate that an uplink data channel with an earlier transmission time is prioritized over an uplink data channel with a later transmission time; and a fifth priority rule used to indicate that an uplink data channel with a smaller CG index is prioritized over an uplink data channel with a larger CG index.

In another implementation manner, the processing module being configured to: when the predetermined processing method is the first processing method, process a PUCCH and at least one uplink data channel according to a predetermined processing method includes: executing a first behavior when a first condition is met; where the first condition includes at least one of the following: a media access control MAC layer is configured with a lch-based Prioritization parameter; DG for scheduling the at least one uplink data channel is scrambled by a target scrambling code; the DG for scheduling the at least one uplink data channel is used for the first transmission; CG for scheduling the at least one uplink data channel is delivered to a HARQ entity; no MAC PDU is generated for the CG for scheduling the at least one uplink data channel; UCI carried on the PUCCH is multiplexed on the at least one uplink data channel; and the first behavior includes at least one of the following: determining that a priority of the first uplink grant is higher than a priority of the second uplink grant; determining that the second uplink grant is a de-prioritized uplink grant; and determining that a first scheduling request is a de-prioritized scheduling request; where the first uplink grant is DG or CG corresponding to a second uplink data channel, and the second uplink data channel is a channel multiplexed with the UCI among the at least one uplink data channel; the second uplink grant is CG or DG corresponding to a third uplink data channel, and the third uplink data channel is a channel overlapping with the second uplink data channel among the at least one uplink data channel; and the first scheduling request is a scheduling request for scheduling the at least one uplink data channel.

In another implementation manner, the processing module 510 is configured to: when uplink data channels of at least two CGs overlap in the at least one uplink data channel and UCI is multiplexed on the uplink data channels of the CGs, determine a target uplink grant according to a sixth priority rule; where the target uplink grant is any one of the at least two CGs, and a priority of the target uplink grant is higher than those of other uplink grants of the at least two CGs other than the target uplink grant; where the sixth priority rule includes at least one of the following: a priority of a CG corresponding to an uplink data channel with an earlier transmission time is higher than a priority of a CG corresponding to an uplink data channel with a later transmission time; a CG with a smaller index is prioritized over a CG with a larger index; and the terminal determines the target uplink grant of the at least two CGs.

In another implementation manner, the processing module 510 being configured to: when the predetermined processing method is the second processing method, process a PUCCH and at least one uplink data channel according to a predetermined processing method includes any one of the following: an first MAC PDU that is not generated participates in a UCI multiplexing process; and the first MAC PDU that is not generated does not participate in the UCI multiplexing process, where the first MAC PDU is a MAC PDU corresponding to the at least one uplink data channel, and the UCI multiplexing process is a multiplexing process between the UCI carried on the PUCCH and the at least one uplink data channel.

In another implementation manner, that the first MAC PDU that is not generated does not participate in the UCI multiplexing process includes: when there is no resource conflict between the PUCCH and the first MAC PDU that is not generated, the UCI is transmitted through the PUCCH; and when there is a resource conflict between the PUCCH and the first MAC PDU that is not generated, the UCI carried on the PUCCH is discarded or transmitted.

In another implementation manner, whether the first MAC PDU that is not generated participates in or does not participate in the UCI multiplexing process is determined according to a specified processing time; where the specified processing time includes a first processing time and/or a second processing time, the first processing time is used to indicate a time when UCI is multiplexed on the PUSCH, and the second processing time is used to indicate a time when the MAC layer determines whether to generate a DG MAC PDU or a CG MAC PDU.

In another implementation, the determining, by the processing module 510 according to a specified processing time, whether the MAC PDU that is not generated participates in or does not participate in the UCI multiplexing process includes: when a third processing time is earlier than a fourth processing time, the first MAC PDU that is not generated does not participate in the UCI multiplexing process; and when the third processing time is not earlier than the fourth processing time, the first MAC PDU that is not generated participates in the UCI multiplexing process; where the third processing time is determined according to the first time and the second processing time, and the first time is a time corresponding to a start symbol of the CG; and the fourth processing time is determined according to the first processing time and the second time, the second time is a time corresponding to the first symbol of a target channel, and the target channel is a channel earlier transmitted in the PUCCH and the at least one uplink data channel.

In another implementation manner, the processing module 510 being configured to: when the predetermined processing method is the second processing method, process the PUCCH and at least one uplink data channel according to the predetermined processing method includes: when the first MAC PDU is generated and the UCI carried on the PUCCH is multiplexed and transmitted on an uplink data channel corresponding to the first MAC PDU, the requirement of the first processing time is met, and the first processing time indicates a time when UCI is multiplexed on the uplink data channel.

In another implementation manner, the PUCCH has the same priority as that of the at least one uplink data channel; or the PUCCH has a priority different from that of the at least one uplink data channel.

In another implementation manner, the priority includes a physical layer priority and/or a logical channel-based priority.

In another implementation manner, the uplink data channel includes a physical uplink shared channel PUSCH of the DG and/or a PUSCH of the CG.

In the embodiments, when the PUCCH overlaps with at least one uplink data channel, the PUCCH and the at least one uplink data channel are processed according to a predetermined processing method, and the PUCCH carries uplink control information UCI. Therefore, it can solve the problem that it cannot be determined whether the terminal uses the UL skipping rule or the lch-based Prioritization rule, and improve the wireless communication performance.

The communication transmission apparatus in the embodiment of the present application may be a device, or a component, an integrated circuit, or a chip in a terminal. The apparatus may be a mobile terminal, or a non-mobile terminal. For example, the mobile terminal may include but is not limited to the foregoing listed types of terminals 11. The non-mobile terminal may be a server, a Network Attached Storage (NAS), a personal computer, a television, a teller machine, or a self-service machine. This is not specifically limited in this embodiment of this application.

The communication transmission apparatus in the embodiment of the present application may be an apparatus with an operating system. The operating system may be an Android operating system, may be an iOS operating system, or may be another possible operating system. This is not specifically limited in this embodiment of this application.

The communication transmission apparatus according to this embodiment of the present application can implement the processes in the method embodiments in FIG. 2, FIG. 3, and FIG. 4*a* to FIG. 4*b*, and achieve the same technical effect. To avoid repetition, details are not described herein again.

Figure 6:
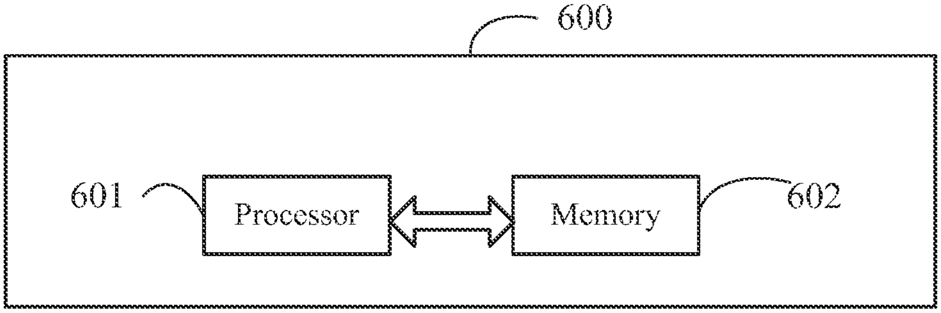
FIG. 6 is a schematic block diagram of a communication device provided by an exemplary embodiment of the present application.

In some implementations, as shown in FIG. 6, an embodiment of the present application further provides a communication device 600, including a processor 601, a memory 602, and a program or an instruction stored in the memory 602 and executable on the processor 601. For example, when the communication device 600 is a terminal, when the program or instruction is executed by the processor 601, each process of the embodiment of the foregoing communication transmission method is performed, and the same technical effect can be achieved. When the communication device 600 is a network side device, when the programs or instructions are executed by the processor 601, each process of the above embodiment of the communication transmission method is performed, and the same technical effect can be achieved. To avoid repetition, details are not repeated herein.

Figure 7:
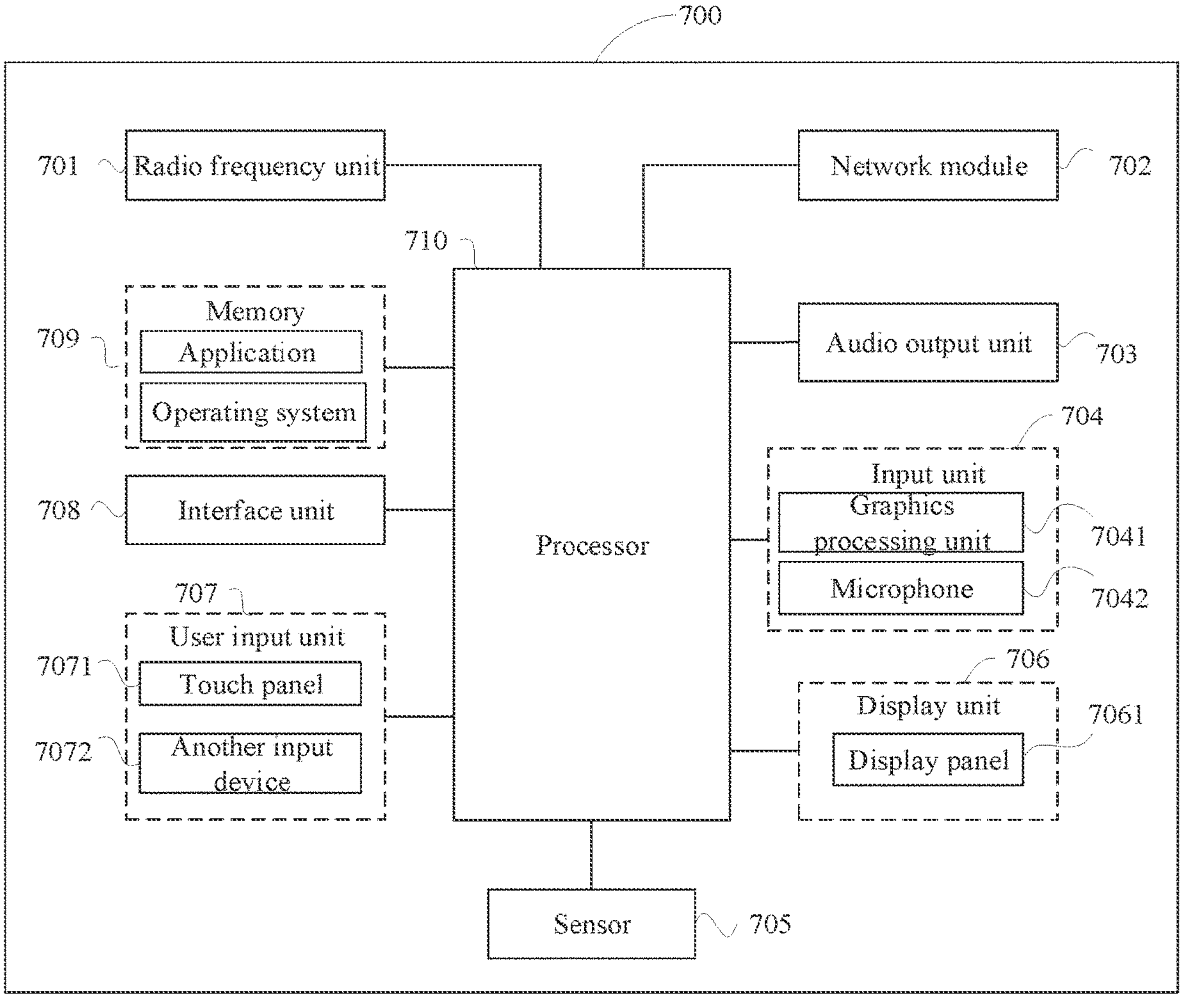
FIG. 7 is a schematic structural diagram of a terminal provided by an example embodiment of this application.

In an implementation manner, the communication device may be a terminal. For example, FIG. 7 is a schematic diagram of a hardware structure of a terminal implementing an embodiment of the present application. The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (such as a battery) that supplies power to each component. The power supply may be logically connected to the processor 710 by using a power supply management system, to implement functions such as charging and discharging management, and power consumption management by using the power supply management system. The terminal structure shown in FIG. 7 constitutes no limitation on the terminal, and the terminal may include more or fewer components than those shown in the figure, or combine some components, or have different component arrangements. Details are not described herein.

It should be understood that in the embodiments of this application, the input unit 704 may include a Graphics Processing Unit (GPU) 7041 and a microphone 7042, and the graphics processing unit 7041 processes image data of a still picture or video obtained by an image capture apparatus (such as a camera) in a video capture mode or an image capture mode. The display unit 706 may include a display panel 7061. The display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network side device and then sends the downlink data to the processor 710 for processing; and sends uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application or an instruction required by at least one function (for example, a sound playing function or an image playing function). In addition, the memory 709 may include a high-speed random access memory, and may further include a non-volatile memory. The non-volatile memory may be a Read-only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 710 may include one or more processing units. In some implementations, an application processor and a modem processor may be integrated into the processor 710. The application processor mainly processes an operating system, a user interface, an application, an instruction, or the like. The modem processor mainly processes wireless communications, for example, a baseband processor. It can be understood that, in some implementations, the modem processor may not be integrated into the processor 710.

The processor 710 is configured to: process the PUCCH and the at least one uplink data channel according to a predetermined processing method when a physical uplink control channel PUCCH overlaps with at least one uplink data channel, where the PUCCH carries uplink control information UCI; and the predetermined processing method includes any one of the following: a first processing method, where the first processing method indicates that a priority of the uplink skipping UL skipping rule is higher than a priority of the logical channel-based Prioritization (lch-based Prioritization) rule; a second processing method, where the second processing method indicates that the priority of the lch-based Prioritization rule is higher than the priority of the UL skipping rule; a third processing method, where the third processing method indicates that a terminal determines whether to use the UL skipping rule or the lch-based Prioritization rule; and a fourth processing method, where the fourth processing method indicates that according to a configuration or scheduling method of a network side device, it is determined whether the UL Skipping rule or the lch-based Prioritization rule is used.

In the embodiments of the present application, when the PUCCH overlaps with at least one uplink data channel, the PUCCH and the at least one uplink data channel are processed according to a predetermined processing method, and the PUCCH carries uplink control information UCI. Therefore, it can solve the problem that it cannot be determined whether the terminal uses the UL skipping rule or the lch-based Prioritization rule, and improve the wireless communication performance.

Figure 8:
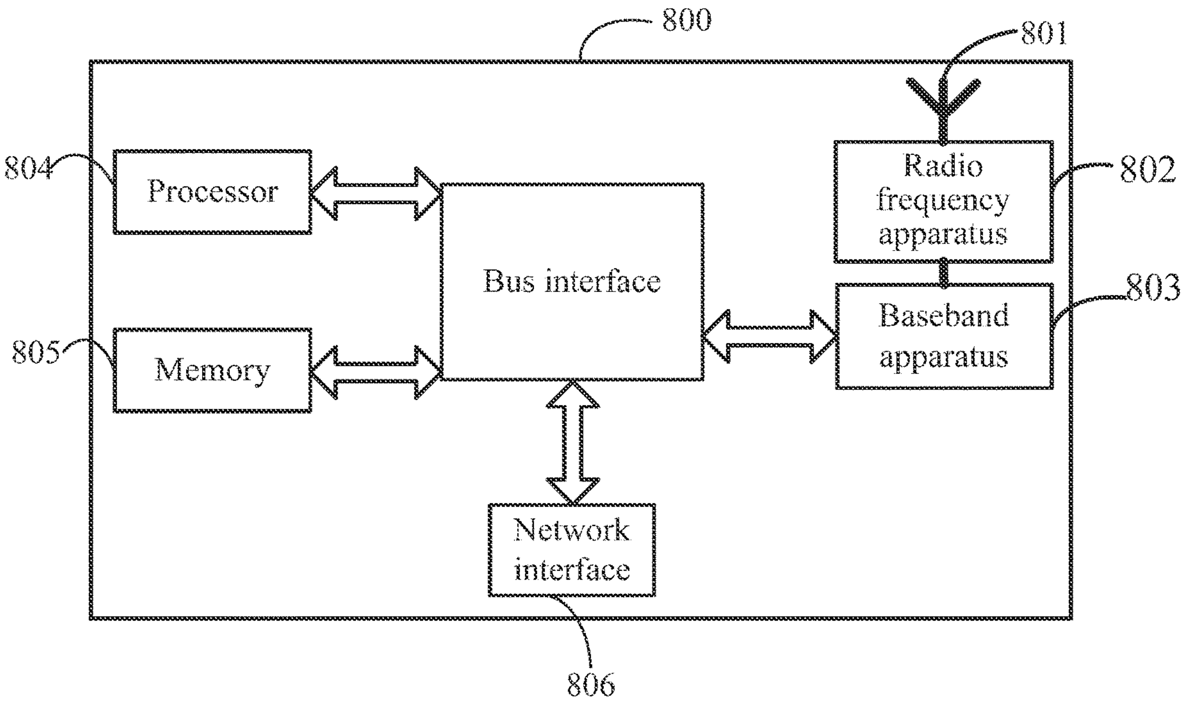
FIG. 8 is a schematic structural diagram of a network side device provided by an example embodiment of this application.

In another implementation manner, the communication device may also be a network side device. FIG. 8 is a schematic block diagram of a network side device 800 provided in an embodiment of the present application. The network side device 800 includes: an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes information to be sent and sends the information to the radio frequency apparatus 82, and the radio frequency apparatus 82 processes the received information and sends the information through the antenna 81.

The frequency band processing apparatus may be located in the baseband apparatus 803. The method performed by the network side device in the foregoing embodiment may be implemented in the baseband apparatus 803. The baseband apparatus 803 includes a processor 804 and a memory 805.

The baseband apparatus 803 may include, for example, at least one baseband board, where a plurality of chips are disposed on the baseband board. As shown in FIG. 8, one chip is, for example, the processor 804, which is connected to the memory 805, so as to invoke a program in the memory 805 to perform operations of the network side device shown in the foregoing method embodiment.

The baseband apparatus 803 may further include a network interface 806, configured to exchange information with the radio frequency apparatus 802. For example, the interface is a Common Public Radio Interface (CPRI).

In some implementations, the network side device in this embodiment of the present application further includes an instruction or a program stored in the memory 805 and executable on the processor 804. The processor 804 invokes the instruction or the program in the memory 805 to perform the method performed by the modules shown in FIG. 5, with the same technical effect achieved. To avoid repetition, details are not provided herein again.

An embodiment of the present application further provides a readable storage medium. The readable storage medium stores a program or an instruction, and when the program or the instruction is executed by a processor, the various processes of the foregoing communication transmission method embodiment is performed and the same technical effects can be achieved. To avoid repetition, details are not described herein again.

The processor is a processor in the terminal in the foregoing embodiment. The readable storage medium includes a computer-readable storage medium, such as a computer Read-only Memory (ROM), a Random Access Memory (RAM), a magnetic disk, or an optical disc.

An embodiment of the present application further provides a chip, the chip includes a processor and a communication interface, the communication interface is coupled to the processor, and the processor is configured to run the program or instruction of the network side device to realize each process of the embodiment of the communication transmission method, and can achieve the same technical effect. To avoid repetition, details are not repeated herein.

It should be understood that the chip mentioned in this embodiment of this application may also be referred to as a system-level chip, a system chip, a chip system, or an on-chip system chip.

The embodiments of the present application further provide a computer program product, the computer program product includes a processor, a memory, and a program or an instruction stored in the memory and executable on the processor, when the program or the instruction is executed by the processor, each process of the above-mentioned communication transmission method embodiment can be realized, and the same technical effect can be achieved. To avoid repetition, details are not repeated herein.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. A communication transmission method, comprising:

processing, by a communication device, a Physical Uplink Control CHannel (PUCCH) and at least one uplink data channel according to a predetermined processing method when the PUCCH overlaps with the at least one uplink data channel, wherein the PUCCH carries Uplink Control Information (UCI), and the predetermined processing method comprises:

determining, according to a configuration or scheduling manner of a network side device, whether to use an UpLink (UL) Skipping rule or a logical channel-based Prioritization (lch-based Prioritization) rule;

in response to determining that the lch-based Prioritization rule is to be preferentially used, configuring the communication device only with the lch-based Prioritization rule, and performing processing only according to the lch-based Prioritization rule by the communication device; and in response to determining that the UL skipping rule is to be preferentially used, configuring the communication device only with the UL skipping rule, and performing processing only according to the UL skipping rule by the communication device.

2. The communication transmission method according to claim 1, wherein the at least one uplink data channel overlaps with each other at least partially.

3. The communication transmission method according to claim 1, wherein processing the PUCCH and the at least one uplink data channel according to a predetermined processing method further comprises:

a first Medium Access Control Protocol Data Unit (MAC PDU) that is not generated does not participate in a UCI multiplexing process, wherein the first MAC PDU is a MAC PDU corresponding to the at least one uplink data channel, and the UCI multiplexing process is a multiplexing process between the UCI carried on the PUCCH and the at least one uplink data channel.

4. The communication transmission method according to claim 3, wherein that the first MAC PDU that is not generated does not participate in the UCI multiplexing process comprises:

when there is no resource conflict between the PUCCH and the first MAC PDU that is not generated, the UCI is transmitted through the PUCCH; and when there is a resource conflict between the PUCCH and the first MAC PDU that is not generated, the UCI carried on the PUCCH is discarded or transmitted.

5. The communication transmission method according to claim 3, wherein whether the first MAC PDU that is not generated participates in or does not participate in the UCI multiplexing process is determined according to a specified processing time, wherein the specified processing time comprises a first processing time or a second processing time, the first processing time is used to indicate a time when UCI is multiplexed on a Physical Uplink Shared CHannel (PUSCH), and the second processing time is used to indicate a time when the MAC layer determines whether to generate a Dynamic Grant (DG) MAC PDU or a Configured Grant (CG) MAC PDU.

6. The communication transmission method according to claim 5, wherein determining, according to the specified processing time, whether the first MAC PDU that is not generated participates in or does not participate in the UCI multiplexing process comprises:

when a third processing time is earlier than a fourth processing time, the first MAC PDU that is not generated does not participate in the UCI multiplexing process; and when the third processing time is not earlier than the fourth processing time, the first MAC PDU that is not generated participates in the UCI multiplexing process, wherein the third processing time is determined according to a first time and the second processing time, and the first time is a time corresponding to a start symbol of a Dynamic Grant (CG), and wherein the fourth processing time is determined according to the first processing time and a second time, the second time is a time corresponding to the first symbol of a target channel, and the target channel is a channel earlier transmitted in the PUCCH and the at least one uplink data channel.

7. The communication transmission method according to claim 1, wherein the PUCCH has a same priority as that of the at least one uplink data channel, or the PUCCH has a priority different from that of the at least one uplink data channel.

8. The communication transmission method according to claim 7, wherein the priority comprises a physical layer priority or a logical channel-based priority.

9. The communication transmission method according to claim 1, wherein the uplink data channel comprises a Physical Uplink Shared CHannel (PUSCH) of the Dynamic Grant (DG) or a PUSCH of the Configured Grant (CG).

10. A communication device, comprising:

a memory storing computer-readable instructions; and a processor coupled to the memory and configured to execute the computer-readable instructions, wherein the computer-readable instructions, when executed by the processor, cause the processor to perform operations comprising:

processing a Physical Uplink Control CHannel (PUCCH) and at least one uplink data channel according to a predetermined processing method when the PUCCH overlaps with the at least one uplink data channel, wherein the PUCCH carries Uplink Control Information (UCI), and the predetermined processing method comprises:

determining, according to a configuration or scheduling manner of a network side device, whether to use an UpLink (UL) Skipping rule or a logical channel-based Prioritization (lch-based Prioritization) rule;

in response to determining that the lch-based Prioritization rule is to be preferentially used, configuring the communication device only with the lch-based Prioritization rule, and performing processing only according to the lch-based Prioritization rule by the communication device; and in response to determining that the UL skipping rule is to be preferentially used, configuring the communication device only with the UL skipping rule, and performing processing only according to the UL skipping rule by the communication device.

11. The communication device according to claim 10, wherein processing the PUCCH and the at least one uplink data channel further comprises:

a first Medium Access Control Protocol Data Unit (MAC PDU) that is not generated does not participate in a UCI multiplexing process, wherein the first MAC PDU is a MAC PDU corresponding to the at least one uplink data channel, and the UCI multiplexing process is a multiplexing process between the UCI carried on the PUCCH and the at least one uplink data channel.

12. The communication device according to claim 11, wherein that the first MAC PDU that is not generated does not participate in the UCI multiplexing process comprises:

when there is no resource conflict between the PUCCH and the first MAC PDU that is not generated, the UCI is transmitted through the PUCCH; and when there is a resource conflict between the PUCCH and the first MAC PDU that is not generated, the UCI carried on the PUCCH is discarded or transmitted.

13. The communication device according to claim 11, wherein whether the first MAC PDU that is not generated participates in or does not participate in the UCI multiplexing process is determined according to a specified processing time, wherein the specified processing time comprises a first processing time or a second processing time, the first processing time is used to indicate a time when UCI is multiplexed on a Physical Uplink Shared CHannel (PUSCH), and the second processing time is used to indicate a time when the MAC layer determines whether to generate a Dynamic Grant (DG) MAC PDU or a Configured Grant (CG) MAC PDU.

14. The communication device according to claim 13, wherein determining, according to the specified processing time, whether the first MAC PDU that is not generated participates in or does not participate in the UCI multiplexing process comprises:

when a third processing time is earlier than a fourth processing time, the first MAC PDU that is not generated does not participate in the UCI multiplexing process; and when the third processing time is not earlier than the fourth processing time, the first MAC PDU that is not generated participates in the UCI multiplexing process, wherein the third processing time is determined according to a first time and the second processing time, and the first time is a time corresponding to a start symbol of a Dynamic Grant (CG), and wherein the fourth processing time is determined according to the first processing time and a second time, the second time is a time corresponding to the first symbol of a target channel, and the target channel is a channel earlier transmitted in the PUCCH and the at least one uplink data channel.

15. The communication device according to claim 10, wherein the at least one uplink data channel overlaps with each other at least partially.

16. The communication device according to claim 10, wherein the PUCCH has a same priority as that of the at least one uplink data channel, or the PUCCH has a priority different from that of the at least one uplink data channel.

17. The communication device according to claim 16, wherein the priority comprises a physical layer priority or a logical channel-based priority.

18. The communication device according to claim 10, wherein the uplink data channel comprises a Physical Uplink Shared CHannel (PUSCH) of the Dynamic Grant (DG) or a PUSCH of the Configured Grant (CG).

19. A non-transitory computer-readable medium storing instructions that, when executed by a processor of a communication device, cause the processor to perform operations comprising:

processing a Physical Uplink Control CHannel (PUCCH) and at least one uplink data channel according to a predetermined processing method when the PUCCH overlaps with the at least one uplink data channel, wherein the PUCCH carries Uplink Control Information (UCI), and the predetermined processing method comprises:

determining, according to a configuration or scheduling manner of a network side device, whether to use an UpLink (UL) Skipping rule or a logical channel-based Prioritization (lch-based Prioritization) rule;

in response to determining that the lch-based Prioritization rule is to be preferentially used, configuring the communication device only with the lch-based Prioritization rule, and performing processing only according to the lch-based Prioritization rule by the communication device; and in response to determining that the UL skipping rule is to be preferentially used, configuring the communication device only with the UL skipping rule, and performing processing only according to the UL skipping rule by the communication device.

20. The non-transitory computer-readable medium according to claim 19, wherein the at least one uplink data channel overlaps with each other at least partially.

* * * * *